United States Patent [19]

Stephens

[11] 4,010,935
[45] Mar. 8, 1977

[54] HIGH EFFICIENCY ALUMINUM SCRAP MELTER AND PROCESS THEREFOR

[75] Inventor: Wilbur E. Stephens, Redwood City, Calif.

[73] Assignee: Alumax Inc., San Mateo, Calif.

[22] Filed: Dec. 22, 1975

[21] Appl. No.: 643,360

[52] U.S. Cl. .............................. 266/44; 266/141; 266/155; 266/156; 266/901

[51] Int. Cl.² ........................................ C21B 11/00

[58] Field of Search ............ 266/901, 44, 155, 156, 266/141; 75/68 R, 93 R

[56] References Cited

UNITED STATES PATENTS 2,794,631  6/1957  Becker et al. .................... 266/141
3,839,016  10/1974  Rawlings ....................... 266/901 X Primary Examiner—John E. Roethel
Attorney, Agent, or Firm—Kasper T. Serijan; Eugene J. Kalil

[57] ABSTRACT

A high efficiency aluminum scrap melting system is provided in which a portion of the hot combustion gases employed to melt the aluminum in a hearth is recycled through scrap-receiving preheat compartments to preheat scrap and volatilize contaminants as the scrap is fed to the hearth, the remainder of the hot combustion gases leaving the hearth as hot exhaust gases being optionally employed through a recuperator to preheat air which is fed to a combustion burner system used to burn hydrocarbon fuel and provide heat for the overall system. Energy available in the contaminants also supplements the energy supply to the system.

13 Claims, 4 Drawing Figures

HIGH EFFICIENCY ALUMINUM SCRAP MELTER AND PROCESS THEREFOR

This invention relates to an integrated aluminum scrap melting system characterized by improved thermal efficiency and to a process of melting aluminum scrap in which the amount of thermal energy employed per pound of aluminum melted is substantially reduced.

STATE OF THE ART

Existing fuel fired aluminum melting furnaces are generally direct fired with limited areas for heat absorption, such that the exhaust gases are emitted at relatively high temperatures. A conventional melting furnace may utilize hot gases formed by the combustion of carbonaceous materials, e.g. hydrocarbons, such as fuel oil, natural gas, powdered coal and the like, to produce temperatures in the range of 3000° F to 3400° F, the exhaust gases delivered to the stack generally ranging in temperature from about 2000° F to 2500° F.

When using conventional direct fired furnaces of the type utilizing high temperature gases referred to hereinabove, it is not uncommon for the fuel input to correspond to about 2000 to 3500 BTU's/hr/lb of aluminum melted, the thermal efficiency of the operation being rather low, for example, less than 30%, the thermal efficiency in many instances ranging from about 10% to 20%.

Aluminum scrap, such as turnings, borings, grindings and other forms of machinings, generally contain lubricating oil or other forms of hydrocarbon contaminants which must be removed to avoid contamination of the environment. Generally, separate charge driers are employed together with a separate after-burner combustion chamber in order to incinerate the hydrocarbons emitted from the scrap.

I have found that I can increase the thermal efficiency to the range of about 40% to 50% by employing a novel integrated scrap melting system.

OBJECTS OF THE INVENTION

It is thus an object of the invention to provide an aluminum scrap-melting system and a process for melting scrap metal, e.g. aluminum, under conditions of improved thermal efficiency.

These and other objects will more clearly appear from the following disclosure, the claims and the accompanying drawing, wherein:

STATEMENT OF THE INVENTION

Figure 1:
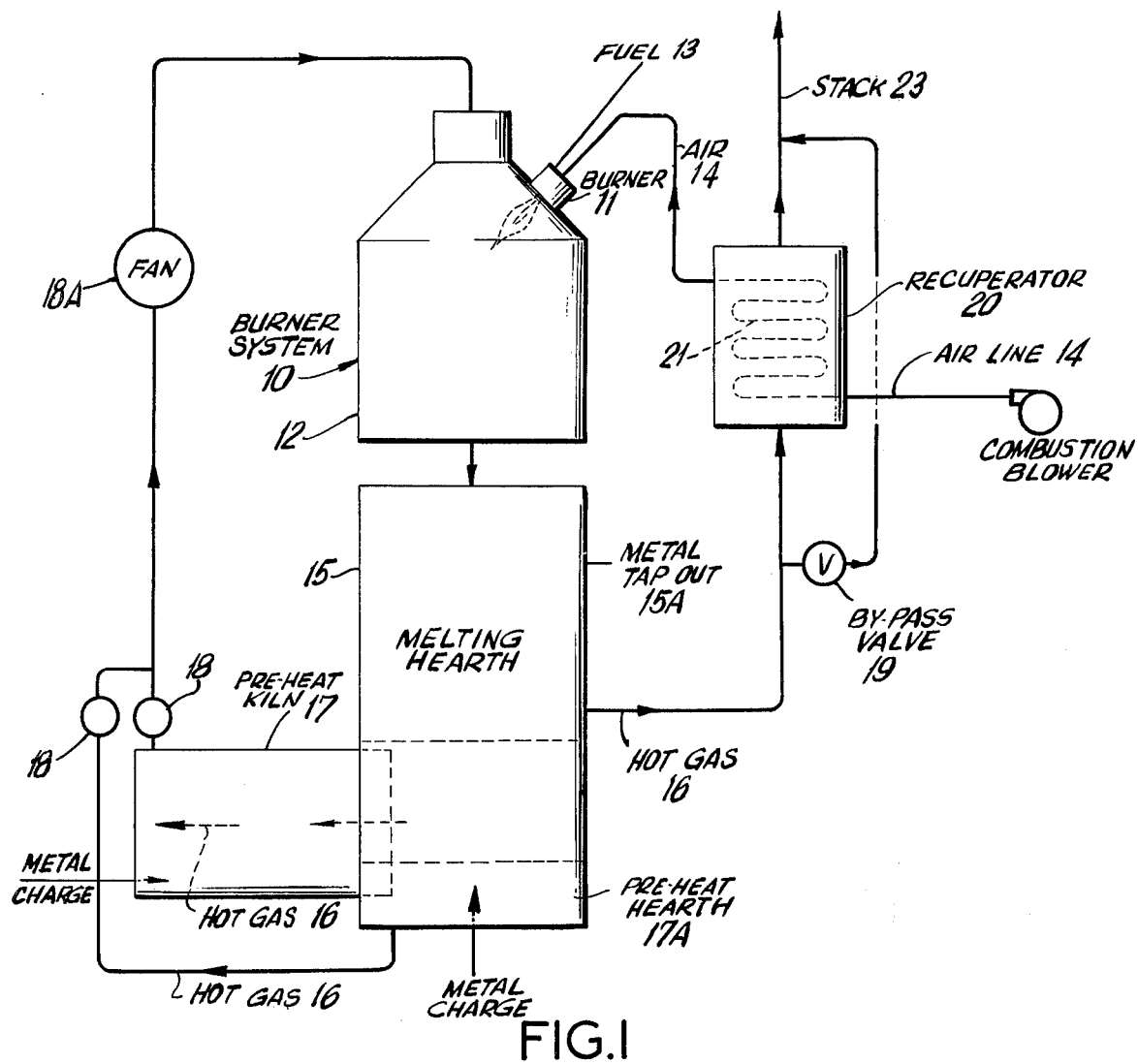
FIG. 1 is a flow sheet illustrating the carrying out of the invention.

One embodiment of the invention resides in a process for improving the efficiency of melting scrap aluminum in a melting furnace, the process comprising providing a furnace having a melting hearth therein communicating with a combustion chamber serving as the burner and an after-burner section by means of which said hearth is heated to a temperature sufficient to melt aluminum by hot gases continuously circulated from said after-burner section to said hearth, charging scrap through a scrap-receiving compartment for melting in said hearth, circulating a portion of effluent hot gases from the hearth through the scrap-receiving compartment in countercurrent flow to the scrap to preheat said scrap prior to charging it into said hearth, and then charging the preheated scrap to the heated hearth to melt the same, whereby a substantial improvement in thermal efficiency is effected per pound of aluminum melted.

An advantage of the invention is that, while preheating the scrap, hydrocarbon contaminants contained in the scrap are removed by the flow of hot gases over the scrap, the hydrocarbons being thereafter burned in the after-burner section of the combustion chamber to avoid polluting of the atmosphere and also to augment the amount of heat delivered to the scrap melting hearth.

An additional advantage is that the remainder of the effluent hot gases emanating from the hearth as hot exhaust gases can be conducted to a recuperator for preheating air fed to the burner system. This results in a cooler gas discharged to the exhaust stack and also in greater utilization of the heat in the circuit.

Another embodiment of the invention is directed to a high efficiency integrated aluminum scrap melting system comprising in combination, a hearth for receiving a charge of scrap aluminum, a combustion chamber comprising a burner and an after-burner section communicating with said hearth, said fuel burner being adapted to burn hydrocarbon fuel to produce hot gases in said after-burner section for circulation through said hearth for melting scrap aluminum, a scrap preheat compartment in communication with said hearth for charging aluminum scrap therethrough into said hearth, means for conducting a portion of hot gas effluent from said hearth to said scrap compartment in countercurrent flow to said scrap preheat compartment to the after-burner section of said combustion chamber, and means for conducting the remainder of said hot gas effluent from said hearth as hot exhaust gases to an exhaust stack, whereby a marked improvement in thermal efficiency is effected per pound of aluminum melted.

In a more preferred embodiment, a recuperator is employed to take the remainder of the gas effluent from the hearth and use it to preheat air going into the burner of the combustion chamber.

By utilizing the foregoing integrated system, the hot gases leaving the after-burner section can be controlled over a temperature range of about 2000° F to 2500° F as compared to temperatures over 3000° F in conventional systems, with the hot effluent gas leaving the hearth controlled over the range of about 1600° F to 2000° F, a portion of it being used for preheating the scrap charge, the remainder portion as hot exhaust gases going through the recuperator to the exhaust stack at about 1200° F to 1500° F.

By employing the integrated scrap melting system of the invention, the energy usage or the thermal efficiency can be improved from a range of about 10% to 20% to over 30% and up to about 50%, such as a range of about 40% to 50%. The more conventional systems are known to employ fuel inputs of from over 2000 to about 3500 BTU's/hr/lb of aluminum melted; whereas, with the integrated system of the invention, fuel consumption of less than about 2000 BTU's/hr/lb aluminum melted is possible, for example, 1500 BTU's.

Figure 3:
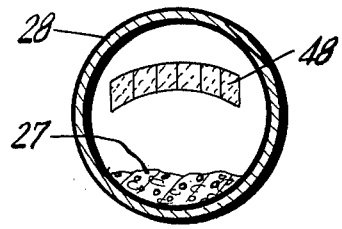
FIG. 3 is a cross sectional view of a rotatable preheat drum taken along line 3—3 of FIG. 2.

The invention will be clearly apparent from the flow sheet of FIG. 1, it being understood that the elements making up the system are preferably integrated into a unit (note FIG. 3).

Thus, referring to FIG. 1, a combustion chamber 10 is shown having a burner section 11 and an after-burner section 12, fuel 13 and air 14 being fed to the burner at predetermined ratios to provide together with recycle effluent hot gases fed to the after-burner section, hot gases in the after-burner section having a temperature of about 2000° F to 2500° F. The final effluent hot gases are fed to scrap-melting hearth 15 to melt the aluminum scrap fed thereto from preheat compartment 17 or 17A. Preheat compartment 17 comprises a rotary kiln used for chopped materials and preheat compartment 17A for receiving compressed bales.

A portion of effluent hot gas 16 leaving the hearth is passed through scrap-receiving preheat compartment 17 to preheat the scrap therein prior to feeding the scrap into the hearth, the scrap being preheated to about, for example, 900° F, the gases being withdrawn via fan 18A either through the preheat compartment 17 or preheat compartment or duct 17A and recirculated to the after-burner section 12 as shown. The remainder of the effluent hot gases exhaust to recuperator 20 or via by-pass valve or damper 19 directly to exhaust stack via line 23. As molten aluminum builds up in the hearth, it is tapped at 15A. A damper 18 permits by-passing preheat compartment 17 for temperature control.

It is preferred, in order to make use of as much residual heat as possible, to conduct the remainder of the effluent hot gases from the hearth as hot exhaust gases directly to recuperator 20 to heat tubes 21 therein for preheating air 14 for feeding to burner 11 of the combustion chamber, the gas going to the stack via line 23 at a temperature of the order of about 1200° F to 1500° F.

In the melting of aluminum, about 200 BTU's per pound aluminum can be used to preheat the scrap to the 900° F range without excessive oxidation. About 300 BTU's per pound aluminum will then be added to the charge by conduction through the heel charge of molten metal. This enables the reduction in temperature of the exhaust gases to a range of about 1200° F to 1500° F, instead of 2000° F to 2500° F common to standard direct fired melting furnaces.

As stated hereinbefore, the gases from the preheat compartment generally contain volatilizable hydrocarbon contaminants which are burned in the after-burner section, the main furnace hearth serving as a settling chamber for particulate fallout, the particulate matter being removed with dross from the molten metal surface.

The flow of gases through the system can be effected several ways, for example, by using fans or, in some instances, by employing injector nozzles.

Figure 2:
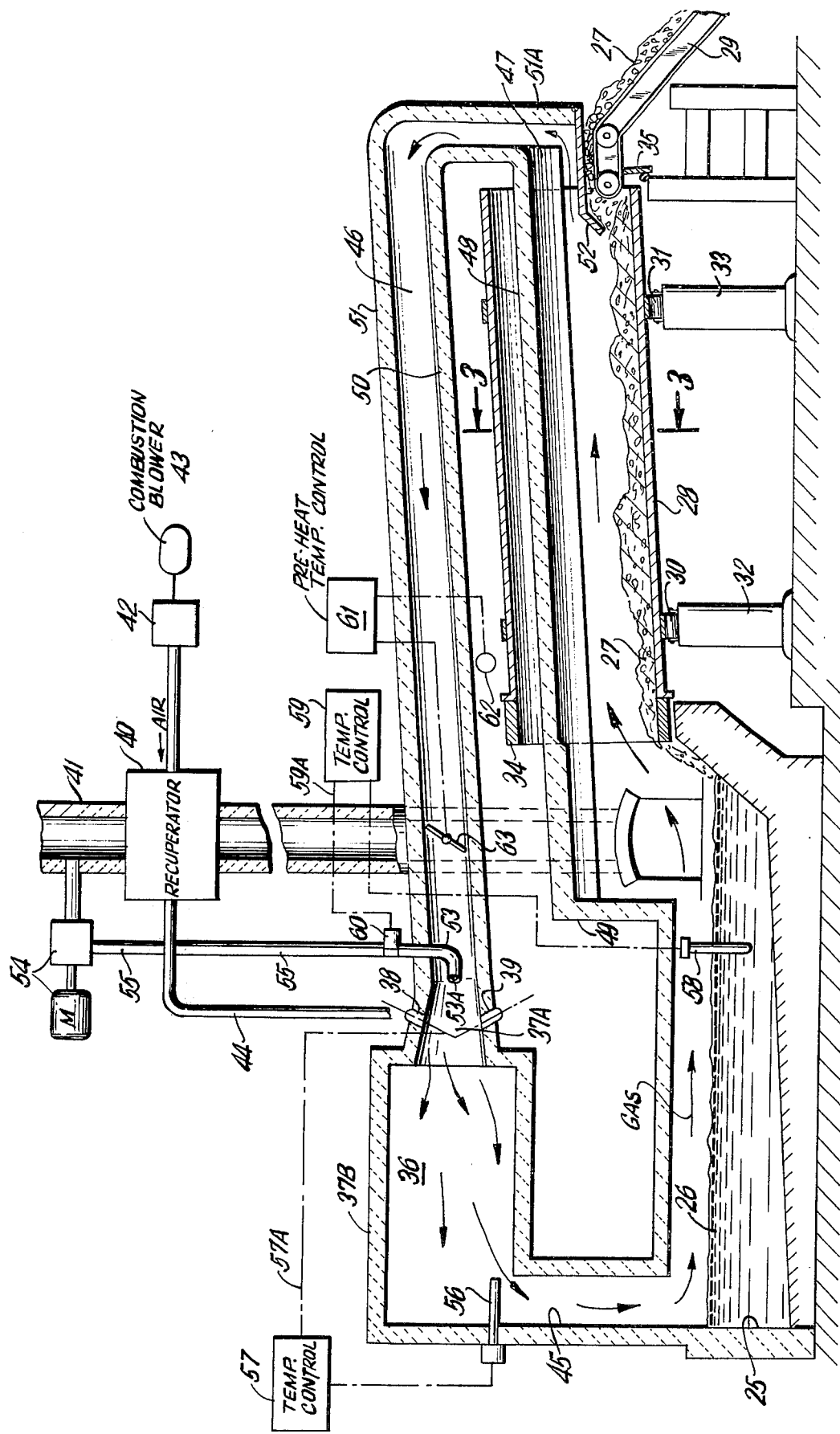
FIG. 2 is a diagrammatic cross section in elevation of pertinent portions of a scrap melting system for use in carrying out the invention.

One embodiment of an integrated scrap-melting system is shown in the diagrammatic cross section of FIG. 2 which depicts a hearth 25 with a molten bath of aluminum 26 formed from scrap 27 in preheated rotatable drum 28, the scrap being fed by an elevator conveyor 29, the drum being inclined downwardly in the direction of the hearth.

The drum is rotatably mounted via rolls shown schematically as 30, 31 supported by pedestals 32, 33, the forward end 34 of the drum communicating with the entrance to the scrap-melting hearth 25. The means for rotating the drum is not shown, such means being well known in the art, for example, rotatable kilns and the like. An air seal 35 is provided adjacent the end of conveyor 29 to provide resistance to the flow of hot gases in the drum outside to the surroundings.

The hot gases for melting the aluminum are produced by combustion chamber 36 comprising a burner section 37A and an after-burner section 37B. The burner portion is shown schematically and generally has a shroud (not shown) for receiving the fuel and air lines, the burner nozzles being depicted schematically at 38, 39, the fuel and air feed to the nozzles being omitted for clarity. Means for feeding preheated air to the burner is shown, the air being drawn through recuperator 40, the recuperator being heated by exhaust gases as shown in FIG. 1, the source of exhaust gases being the hot gases directed to stack 41 for discharge to the atmosphere.

The preheated air is drawn via receiver 42 by means of combustion blower 43, into recuperator 40, the air being fed to the burner via line 44, the line being coupled to means not shown for mixing the air with a hydrocarbon fuel (e.g. fuel oil, natural gas, etc.) for discharge through nozzles 38, 39 into after-burner 37B.

The hot gases from the after-burner flow via interconnecting duct 45 down over the scrap-melting hearth as shown by the arrows, the hot gases giving off heat to the hearth for melting the aluminum, the effluent gases leaving the hearth then entering rotatable drum 28 to preheat scrap 27, the gases then drawn off through return duct 46 via port 47 after passing beneath radiating panel 48 which extends from part of the wall structure 49 of the furnace, the panel, supported by means outside the drum, extending completely through the drum to return duct 46, the return duct providing a downwardly extending overhang 51A which terminates short of conveyor 29 as shown with an inwardly extending partition 52 entering the mouth of the drum which, together with the scrap delivered to the drum, provides a sufficient air seal.

The return duct extends and is coaxially coupled to the burner section of combustion chamber 36. In order to augment the flow of hot gases through the system, an injector 53 is provided extending into and back of the burner section with its nozzle 53A coaxially mounted adjacent the burner section. Hot exhaust gases are withdrawn from stack 41 via motor-fan 54 and delivered to the injector 53 via line 55. Instead of an injector, a fan may be employed.

The radiating panel 48 is advantageous in that, when heated by the flow of hot gases, it enables heating up of the scrap by radiation while the scrap is also being heated by convection flow of hot gases passing through the rotatable drum. The radiating panel 48 is also shown in the cross section of FIG. 3, the radiation panel providing an arcuate surface (concaved but not limited thereto) for radiating heat to scrap 27 passing through the drum.

In order to maintain a substantially steady state condition once the system is on stream, controls may be employed, one to control the temperature in the after-burner, another to control the temperature of the molten bath and still another to control the temperature of the drum.

Referring first to after-burner section 37B, a thermocouple 56 is coupled to temperature controller 57, the controller in turn being adapted via coupling to the burner section to control the fuel and combustion air (oxygen) fed to the burner nozzles. The means for doing this is well known and need not be delineated in the drawing.

The temperature of the bath is controlled by immersion thermocouple 58 which is sensed by means of temperature controller 59 which in turn is adapted via line 59A to effect actuation of valve 60 to change the rate of gas flow through injector 53 or completely shut it off. For example, if the temperature of the bath is below the desired level, the valve 60 is caused to actuate to decrease the amount of exhaust gas flowing into the after-burner section which reduces the dilution effect of this gas on the hot gases generated by the burners. Meanwhile, thermocouple 56 monitors the temperature of the after-burner section and makes whatever adjustment necessary at the burner section via temperature controller 57. A similar sensing and control device can change fan speed or provide damper control for this function.

The temperature of the drum is controlled via temperature controller 61 which is coupled to a radiation temperature detector 62 located adjacent the outside surface of the drum, the temperature of the drum under substantially steady state conditions being related to the pre-heat temperature of the drum being determined by the hot effluent gases from the hearth passing therethrough. The temperature recorder is adapted to effect actuation of damper 63 according to the temperature sensed to open or close it or to set it at a particular opening to provide the desired temperature inside the drum. All three temperature controllers can work together or one can monitor the other.

By utilizing the integrated system described above, marked savings in fuel costs can be effected by controlling the after-burner temperature to a lower value, e.g. 2000° F to 2500° F, as compared to higher values (such as 3000° F to 3400° F) which prevail in conventional melting furnaces.

Figure 4:
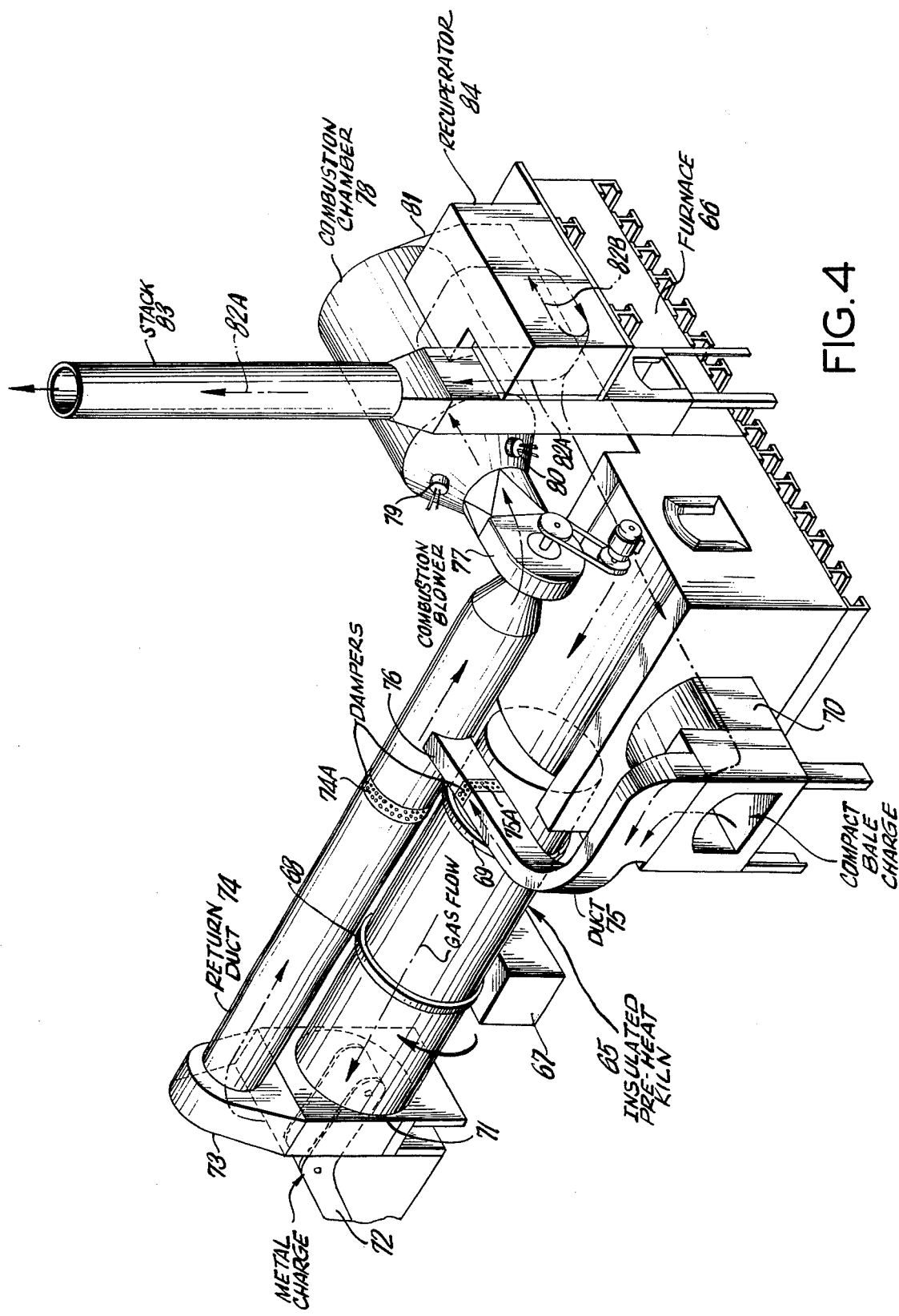
FIG. 4 is a three-dimensional view of an integrated scrap melter in accordance with the invention.

A preferred embodiment of the integrated scrap melting system is depicted in FIG. 4, the system shown comprising an L-shaped configuration with a scrap preheat compartment 65 for one leg of the "L" and an aluminum scrap melting furnace forming the other leg of the L, the preheat compartment being a rotatable kiln of the type shown in FIG. 2. The drum is supported on two pedestals, e.g. 67, with rollers 68, 69. In addition to the rotatable drum, another preheat compartment 70 is provided for receiving compactd bales of aluminum scrap for charging into the hearth.

The scrap-receiving end 71 of rotatable kiln 65 extends to and is in scrap-receiving relationship with an elevator conveyor 72 which is mounted to end support 73 which is hollow and which is coupled to return duct 74 to provide gas flow communication between the rotatable drum and the return duct. The bale-receiving compartment 70 similarly has a return duct 75 which merges with return duct 74 downstream thereof at 76, the return gases from either kiln 65 or bale-receiving compartment 70 or both being driven by fan 77 into the after-burner section of combustion chamber 78.

The combustion chamber is preferably provided with three burners shown schematically as 79, 80, the third being hidden from view. The forward end of the combustion chamber communicates with the hearth within furnace 66 via duct 81, the hot combustion gases 82 from the after-burner section of the burner flowing through the hearth to effect melting of scrap aluminum therein, a portion of the effluent hot gases from the hearth being then by-passed to either the bale-receiving preheat compartment 70 or preheat drum 65, or both, depending upon the control of dampers (not shown) in the ducts related to each of the preheat compartments.

The remaining portion 82A of the effluent hot gases (as exhaust gases) is by-passed to stack 83, as shown, with a portion 82 being fed to recuperator 84 for preheating air for use in burning hydrocarbon fuel in the combustion chamber. The details of the coupling of the recuperator to the effluent gas flow and the flow of air are not shown, these being obvious to those skilled in the art, the relationship of the elements forming the system being more clearly shown in the flow sheet of FIG. 1 and in the schematic of FIG. 2.

As stated above, dampers may be employed in the ducts to control the flow of hot gases in the system. Such dampers may comprise air dampers using preheated combustion air to form an air curtain across the duct to block longitudinal flow of gases, such as air damper 74A in return duct 74 and air damper 75A in return duct 75.

Thus, summarizing FIG. 4, conventional burners (e.g. 79, 80) will utilize preheated combustion air which flows by means of a combustion blower (not shown) through tubes in the recuperator to the burners using either fuel oil, natural gas or other forms of hydrocarbons. The combustion air preheat temperature will be in the range of about 750° F to 1000° F. The recirculated effluent hot gases from the hearth mix with the burner gases in the after-burner section of the combustion chamber, the burner gases being the primary source of energy input to the scrap melting system.

The hydrocarbon contaminants from the scrap charge will also mix with the burner gases to be burned to provide additional heat input, the temperature of the hot gases from combustion chamber 78 ranging from about 2000° F to 2500° F, the temperature being controlled as described for FIG. 2.

The burner gases flow downward from combustion chamber 78 via duct 81 to the melting hearth area to dissipate heat to the furnace bath by both convection and by radiation, the temperature differential between the bath and the hot gases being approximately 900° F.

The effluent hot gases from the hearth are partly by-passed through the scrap preheat compartment or compartments and the remainder exhausted to the stack with or without first passing through a recuperator to preheat combustion air, an air curtain type of damper being utilized for the by-pass system, the gases passing through the preheat compartment being recycled to the after-burner section.

The rotatable preheat drum will use the effluent hot gases from the furnace in the range of about 1200° F to 2000° F to preheat a scrap charge comprising can litter, turnings, borings or other forms of machinings. The temperature can be further regulated by inducing cold air into the system, if required, through access doors.

The principle of operation and the uniqueness of the integrated scrap smelting system reside in large part to the temperature levels of the thermal energy used. As stated above, a conventional furnace system generally utilizes gas temperatures in the range of about 3000° F to 3400° F; whereas, the system of the invention uses gas temperatures in the range of about 2000° F to 2400° F as the primary source of heat which, following the melting of aluminum, reduces to a level of about 1600° F to 2000° F, the scrap being preheated to a temperature of about 900° F. This system results in a marked improvement in thermal efficiency which helps to compensate in some measure for the recent rise in fuel prices.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A process for improving the efficiency of melting scrap aluminum in a melting furnace which comprises,
    providing a furnace having a melting hearth therein communicating with a combustion chamber having a burner for combusting hydrocarbon fuel and air fed thereto and an after-burner section by means of which said hearth is heated to a temperature to melt aluminum by hot gases formed by combustion and continuously circulated from said after-burner section to said hearth, heating said hearth to an aluminum-melting temperature,
    charging scrap containing hydrocarbon contaminants through a rotatable scrap-receiving preheat kiln for preheating said scrap while rotating said kiln,
    circulating a portion of effluent hot gases from said hearth through said rotating kiln in countercurrent flow to the scrap fed through the kiln to preheat said scrap prior to the charging thereof to said hearth and to remove said hydrocarbon contaminants contained in said scrap,
    charging said preheated scrap to said heated hearth to melt the same,
    recycling said hot gases containing hydrocarbons from said rotating kiln to the after-burner section of said combustion chamber to burn the hydrocarbons removed from said scrap and thereby provide additional heat for melting said aluminum,
    circulating the remainder portion of effluent hot gases from said hearth to a recuperator cooperatively associated with said combustion chamber to preheat air passing through tubes in said recuperator in heat exchange relationship with said effluent hot gases passing through said recuperator,
    conducting said preheated air to the burner of said combustion chamber,
    and conducting said effluent hot gases from said recuperator to an exhaust stack,
        whereby a marked improvement in thermal efficiency is effected per pound of aluminum melted.

2. The process of claim 1, wherein the circulation of hot gases therein is augmented by recycling part of the exhaust gases discharged to the stack to and through the after-burner section of the combustion chamber.

3. The process of claim 2, including the following steps: of sensing the temperature of the hot effluent gases flowing from the after-burner section to the hearth and of varying the amount of hydrocarbon fuel and air fed to said burner in accordance with the temperature sensed; of sensing the preheat temperature in the scrap-receiving compartment and varying the flow of recycle effluent gas to said after-burner section in accordance with the temperature sensed; and of sensing the temperature of the melted aluminum in the hearth and of varying the flow of exhaust gas through the after-burner section in accordance with the temperature sensed in the aluminum bath.

4. An integrated aluminum scrap-melting system comprising in combination,
    a hearth for receiving and melting a charge of scrap aluminum,
    a combustion chamber having an after-burner section communicating with said hearth,
        said combustion chamber having a fuel burner system for burning hydrocarbon fuel with air to produce effluent hot gases in said after-burner section for circulation through said hearth for melting scrap aluminum,
    a rotatable scrap-receiving preheat kiln in communication with said hearth for charging aluminum scrap therethrough into said hearth,
    means for conducting a portion of said effluent hot gases from said hearth through said rotatable kiln in countercurrent flow to scrap fed through said kiln,
    a return duct communicating with said rotatable kiln and said after-burner section of said combustion chamber for conducting said effluent hot gases from said rotatable kiln to said after-burner section,
    and means for conducting the remainder of said effluent hot gases as hot exhaust gases from said hearth through a heat exchanger to an exhaust stack.

5. The scrap-melting system of claim 4, including means for augmenting the flow of hot gases through the system by recycling a portion of the exhaust hot gases through said after-burner section; means for sensing the temperature of the effluent hot gases flowing from said after-burner section and for varying the amount of hydrocarbon fuel and air fed to said fuel burner in accordance with the temperature sensed; means for sensing the preheat temperature in the scrap-receiving compartment and for varying the flow of recycled effluent gases to said after-burner section in accordance with the temperature sensed; and means for sensing the temperature of molten aluminum in the hearth and for varying the flow of exhaust gases recycled through the after-burner section in accordance with the temperature of the molten aluminum sensed.

6. A high efficiency integrated aluminum scrap-melting system comprising in combination,
    a hearth for receiving a charge of scrap aluminum,
    a combustion chamber having an after-burner section communicating with said hearth,
        said combustion chamber having a fuel burner for burning hydrocarbon fuel with air to produce effluent hot gases in said after-burner section for circulation through said hearth for melting scrap aluminum,
    at least one scrap preheat compartment in communication with said hearth for charging aluminum scrap therethrough into said hearth,
        said at least one preheat compartment comprising an elongated rotatable kiln adapted to feed scrap therethrough into said hearth,
    means for conducting a portion of said effluent hot gases from said hearth to said scrap-receiving compartment in countercurrent flow to scrap charge fed through said rotatable kiln into said hearth to preheat said scrap charge, a return duct communicating with said rotatable kiln and said after-burner section of the combustion chamber for conducting said effluent hot gases from said rotatable kiln to said after-burner section, a duct for conducting the remainder of said effluent hot gases as hot exhaust gases from said hearth to a recuperator cooperatively associated with said combustion chamber in said integrated scrap melter, said recuperator comprising a heat exchanger for preheating air for use in the burner of said combustion chamber, means for conducting air through and in heat exchanger relationship with said recuperator to the burner of said combustion chamber to provide preheated air therefor, and means for conducting said hot exhaust gases from said recuperator to an exhaust stack, whereby a marked improvement in thermal efficiency is effected per pound of aluminum melted.

7. The scrap melting system of claim 6, including a radiation panel extending through said rotatable kiln, said panel being supported by means outside said drum.

8. The scrap-melting system of claim 7, wherein said radiation panel has an arcuate cross section and has a concaved face for radiating heat to scrap in said drum.

9. The scrap-melting system of claim 6, wherein the flow of hot gases through the system is augmented by providing means for recycling a portion of the exhaust hot gases through said after-burner section.

10. The scrap-melting system of claim 9, including means for sensing the temperature of the effluent hot gases flowing from said after-burner section and for varying the amount of hydrocarbon fuel and air fed to said fuel burner in accordance with the temperature sensed; means for sensing the preheat temperature in the scrap-receiving compartment and for varying the flow of recycle effluent gases to said after-burner section in accordance with the temperature sensed; and means for sensing the temperature of molten aluminum in the hearth and for varying the flow of exhaust gases recycled through the after-burner section in accordance with the temperature of the molten aluminum sensed.

11. The scrap-melting system of claim 6, including an additional scrap-receiving preheat compartment communicating with said hearth and adapted for feeding compacted bales of scrap aluminum to said hearth for melting therein.

12. A high efficiency integrated aluminum scrap-melting system comprising in combination, a hearth for receiving a charge of scrap aluminum, a combustion chamber having an after-burner section communicating with said hearth, said combustion chamber having a fuel burner for burning hydrocarbon fuel with air to produce effluent hot gases in said after-burner section for circulation through said hearth for melting scrap aluminum, means for sensing the temperature of the effluent hot gases flowing from said after-burner section and for varying the amount of hydrocarbon fuel and air fed to said fuel burner in accordance with the temperature sensed, at least one scrap preheat compartment in communication with said hearth for charging aluminum scrap therethrough into said hearth, said at least one preheat compartment comprising an elongated rotatable kiln adapted to feed scrap therethrough into said hearth, means for conducting a portion of said effluent hot gases from said hearth to said scrap-receiving compartment in countercurrent flow to scrap charge fed through said rotatable kiln into said hearth to preheat said scrap charge, a return duct communicating with said rotatable drum and said after-burner section of the combustion chamber for conducting said effluent hot gases from said rotatable kiln to said after-burner section, means for sensing the preheat temperature in the scrap-receiving compartment and for varying the flow of recycle effluent gases via the return duct to said after-burner section in accordance with the temperature sensed, a duct for conducting the remainder of said effluent hot gases as hot exhaust gases from said hearth to a recuperator cooperatively associated with said combustion chamber in said integrated scrap melter, said recuperator comprising a heat exchanger for preheating air for use in the burner of said combustion chamber, means for conducting air through and in heat exchange relationship with said recuperator to the burner of said combustion chamber to provide preheated air therefor, means for conducting said hot exhaust gases from said recuperator to an exhaust stack, means for augmenting the flow of hot gases through the scrap-melting system by recycling a portion of the exhaust hot gases through said after-burner section, and means for sensing the temperature of molten aluminum in said hearth and for varying the flow of recycle exhaust gases through the after-burner section in accordance with the temperature of the molten aluminum sensed, whereby a marked improvement in thermal efficiency is effected per pound of aluminum melted.

13. The scrap-melting system of claim 12, including an additional scrap-receiving preheat compartment for feeding compacted bales of scrap aluminum to said hearth for melting therein.

* * * * *